(12) United States Patent
Narita et al.

(10) Patent No.: US 6,354,417 B1
(45) Date of Patent: Mar. 12, 2002

(54) TRANSMISSION

(75) Inventors: Satoru Narita; Noriaki Takano, both of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/654,059

(22) Filed: Sep. 1, 2000

(30) Foreign Application Priority Data

Sep. 3, 1999 (JP) ............................................. 11-250059

(51) Int. Cl.[7] .................................................. F16H 3/02
(52) U.S. Cl. ..................................... 192/69.71; 192/108
(58) Field of Search .............................. 192/69.71, 108, 192/69.7, 69.8, 69.83

(56) References Cited

U.S. PATENT DOCUMENTS

| | | | | |
|---|---|---|---|---|
| 2,992,715 A | * | 7/1961 | Blachly | .................... 192/69.71 |
| 4,074,946 A | * | 2/1978 | Swearingen | ................ 403/364 |
| 5,524,738 A | * | 6/1996 | Erlebach et al. | ......... 192/69.83 |
| 6,076,429 A | * | 6/2000 | Valente | ....................... 192/69.8 |

FOREIGN PATENT DOCUMENTS

| | | | |
|---|---|---|---|
| JP | 59-4867 | * | 2/1984 |
| JP | 4-22107 | * | 5/1992 |

* cited by examiner

*Primary Examiner*—Charles A Marmor
*Assistant Examiner*—Saúl Rodriguez
(74) *Attorney, Agent, or Firm*—Birch, Stewart, Kolasch & Birch, LLP

(57) ABSTRACT

The transmission includes a number of male dowels disposed on gear shifters for engaging female dowels on gears. The male dowels are arranged in sets of high and low male dowels, the high and low male dowels being alternately arranged on a side surface of a gear shifter. The male dowels have curved engaging surfaces for engaging respective female dowels. The contact point between the male dowels and the female dowels is radially outward from a radial center of the male dowels, so that a thicker portion of the male dowels absorbs the impact between male and female dowel. The low male dowels need not be machined, which reduces the cost of producing the transmission.

14 Claims, 5 Drawing Sheets

TRANSMISSION

BACKGROUND OF THE INVENTION

1. Field of the Invention

The present invention relates to a dog clutch type transmission suitable for use in a motorcycle or the like.

2. Background Art

A conventional dog clutch in a transmission includes a plurality of angular or round male dowels having the same height, and a plurality of female dowels adapted to engage the male dowels, thereby transmitting torque. This type of dog clutch is shown in Japanese Utility Model Publication Nos. Sho 59-4867 and Hei 4-22107.

Another conventional dowel structure has high male dowels and low male dowels of differing height, with the number of the female dowels being half the number of male dowels. Both the surface of each high male dowel and the surface of each low male dowel are machined. In this arrangement, a female dowel is a dowel hole or a recess adapted to engage a male dowel.

To increase the chance of engagement of the male dowels with the female dowels in the conventional dowel structure, the distance between neighboring ones of the male dowels must be increased, and each male dowel must therefore be reduced in size. However, the size reduction of each male dowel is limited because its strength must be sufficient. The ability to increase the chance of engagement is therefore limited in conventional devices.

In addition, in conventional devices, the play of each male dowel engaged with the corresponding female dowel must be adjusted in magnitude according to characteristics of individual types of transmissions, and the design of the male dowels is limited by the type of transmission in which it is utilitized. It is also necessary to set gears having different dowel specifications for manual and automatic transmissions.

SUMMARY OF THE INVENTION

The present invention overcomes the shortcomings associated with conventional devices and achieves other advantages not realized by conventional devices.

In one embodiment of the invention, a transmission shifts gears by engaging or disengaging a dog clutch, the dog clutch comprising a plurality of angular male dowels and a plurality of female dowels adapted to engage the male dowels. Each of the male dowels has a curved engaging surface, and each of the female dowels has a flat engaging surface for contacting the curved engaging surfaces.

A contact position between the curved engaging surface of each male dowel and the flat engaging surface of each female dowel is offset radially outward from a radial center of each male dowel. The male dowels comprise high male dowels and low male dowels that differ in height, and the high male dowels and the low male dowels are alternately arranged.

The number of female dowels is half the number of the male dowels. The tolerance of the height of each low male dowel is a maximum working tolerance by forging, and the surface of each low male dowel is an unmachined surface left after forging.

Each male dowel is angular, with its engaging surface formed as a curved surface. The engaging surface of each female dowel is formed as a flat surface. Accordingly, a pitch circle of engagement of the male and female dowels can be set, and a contact position between these engaging surfaces can be specified to a most effective position by adjusting the pitch circle.

The contact position between the engaging surfaces of the male and female dowels is offset radially outward by setting the pitch circle to thereby enlarge the radius of rotation of a contact portion between the male and female dowels. Accordingly, the contact portion is a thick-walled portion, and the strength of the male dowels can be ensured. Further, in a usual male dowel, stress concentration tends to occur at the root of a radially inner end of the male dowel. Accordingly, by radially outwardly offsetting the contact point, a stress portion can be spaced apart from the root of the radially inner end. As a result, the strength can be improved as compared with that of a conventional male dowel having a similar size.

The chance of dynamic engagement of the male and female dowels is determined by the start of engagement of these dowels. Accordingly, by alternately arranging the high male dowels and the low male dowels of differing height, the start of engagement is effected by the engagement of the high male dowels into the female dowels, thus ensuring the increased chance of engagement.

After completing the engagement of the high male dowels into the female dowels, the low male dowels are also engaged into the female dowels, so that the play determined after the engagement can be set to a small amount. Thus, the chance of engagement can be increased with the play reduced, and the degree of freedom of design can be increased. As a result, both a foot-operated gear change and a motor-operated gear change can be carried out by the same gear.

The maximum tolerance of the height of each low male dowel is set as a maximum working tolerance by forging. Accordingly, each low male dowel can be used as a forged part. Because the low male dowel is not machined, the number of production steps can be reduced, reducing costs.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
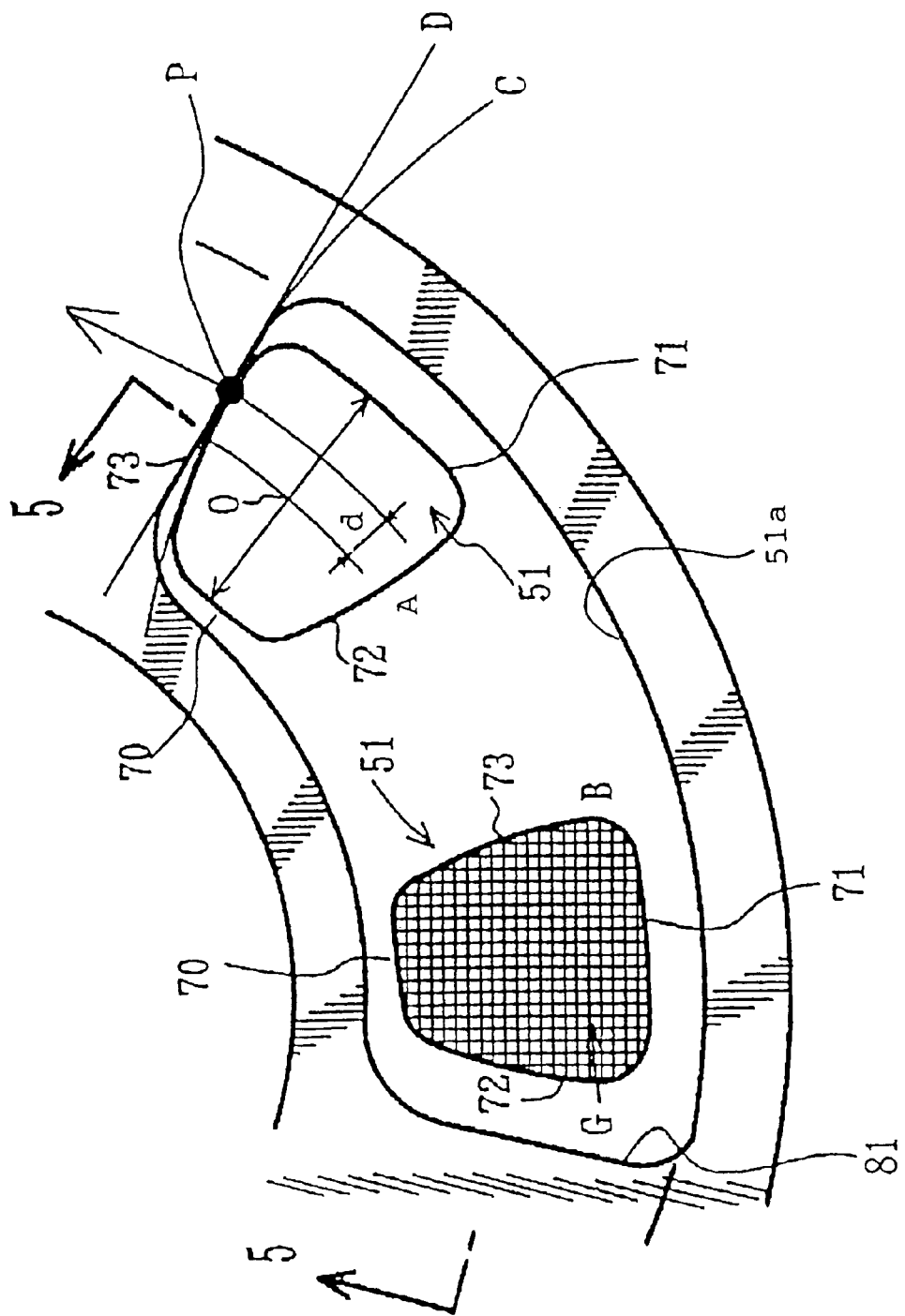
FIG. 1 is an enlarged elevational view illustrating the engagement of dowels according to one embodiment of the present invention.
Figure 2:
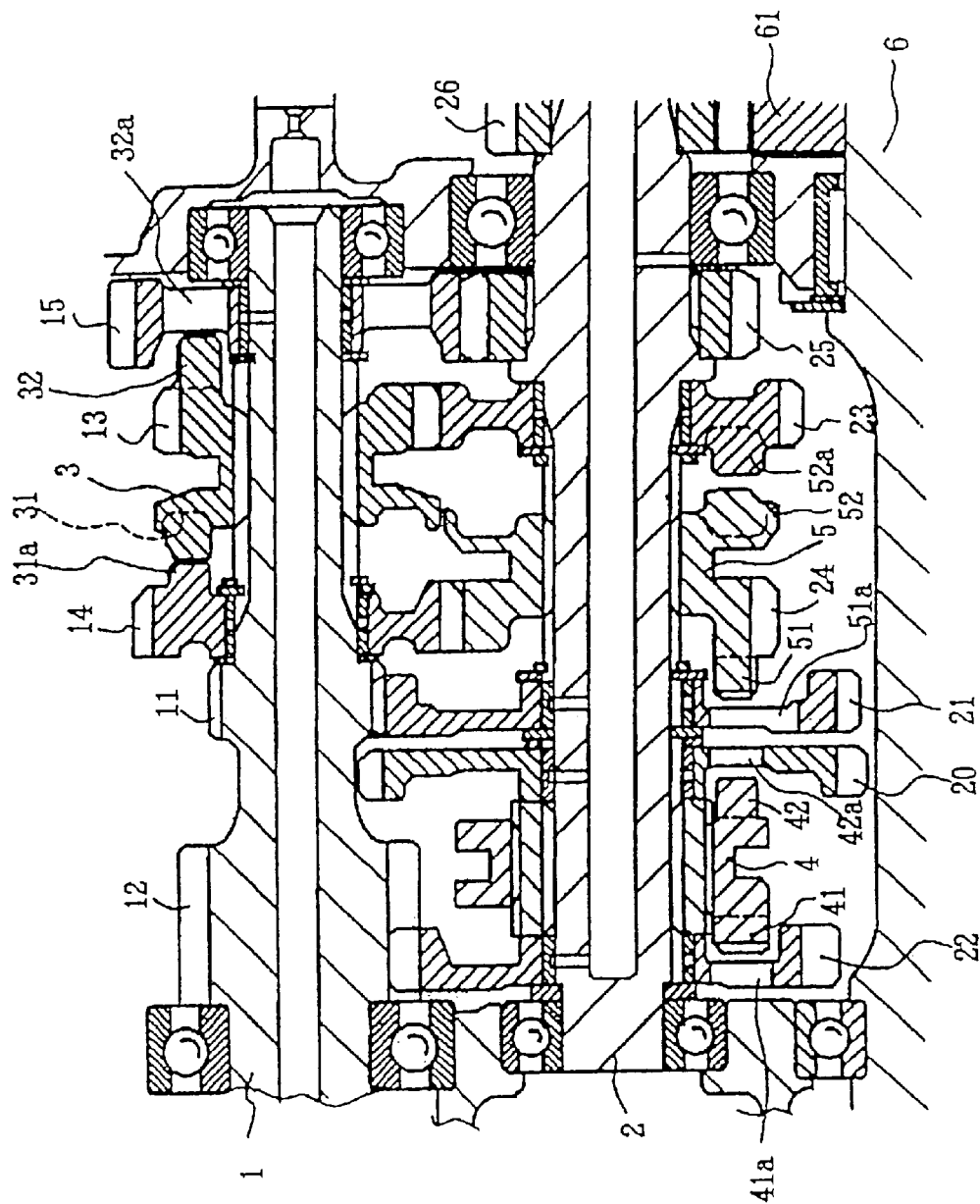
FIG. 2 is a sectional view of a transmission having dowels according to an embodiment of the present invention.

FIG. 1 is an enlarged elevational view illustrating the engagement of dowels according to an embodiment of the present invention. FIG. 2 is a sectional view of a transmission having dowels according to the present invention. In the present specification, the term "male dowel" is used to indicate any surface projecting from another surface, and the term "female dowel" is used to indicate any aperture or recess suitable for receiving a male dowel.

As shown in FIG. 2, the transmission is of a constant-mesh type having a main shaft 1 and a counter shaft 2 parallel to the main shaft 1. Gears provided on the shafts 1 and 2 are in mesh, and any one of first, second, and third shifters 3, 4, and 5 is axially moved to select a desired pair of the meshing gears. The main shaft 1 is integrally formed with a first gear 11 and a second gear 12. A third gear 13 is formed on the outer circumference of the first shifter 3 axially movably splined with the main shaft 1. A fourth gear 14 and a fifth gear 15 are supported on the main shaft 1 so as to be idly rotatable.

A plurality of male dowels 31 are formed on one side surface of the first shifter 3 opposed to the fourth gear 14 so as to be allowed to engage a plurality of female dowels 31a formed on one side surface of the fourth gear 14 opposed to the one side surface of the first shifter 3. Similarly, a plurality of male dowels 32 are formed on the other side surface of the first shifter 3 so as to be allowed to engage a plurality of female dowels 32a formed on one side surface of the fifth gear 15 opposed to the other side surface of the first shifter 3.

A first gear 21, a second gear 22, a third gear 23, and a reverse gear 20 are supported on the counter shaft 2 so as to be idly rotatable. A fourth gear 24 is formed on the outer circumference of the third shifter 5 splined with the counter shaft 2, and a fifth gear 25 is fixedly mounted on the counter shaft 2. The third shifter 5 is axially movably splined with a portion of the counter shaft 2 between the first gear 21 and the third gear 23, and the second shifter 4 is axially movably splined with a portion of the counter shaft 2 between the second gear 22 and the reverse gear 20. An output gear 26 is fixed to an axial end of the counter shaft 2 so as to be rotatable integrally therewith and to mesh with a driven output gear 61 mounted on an output shaft 6.

A plurality of male dowels 51 are formed on one side surface of the third shifter 5 opposed to the first gear 21 so as to be allowed to engage a plurality of female dowels 51a formed on one side surface of the first gear 21 opposed to the one side surface of the third shifter 5. Similarly, a plurality of male dowels 52 are formed on the other side surface of the third shifter 5 so as to be allowed to engage a plurality of female dowels 52a formed on one side surface of the third gear 23 opposed to the other side surface of the third shifter 5.

A plurality of male dowels 41 are formed on one side surface of the second shifter 4 so as to be allowed to engage a plurality of female dowels 41a formed on one side surface of the second gear 22 opposed to the one side surface of the second shifter 4. Similarly, a plurality of male dowels 42 are formed on the other side surface of the second shifter 4 so as to be allowed to engage a plurality of female dowels 42a formed on one side surface of the reverse gear 20 opposed to the other side surface of the second shifter 4.

When the third shifter 5 is moved leftward as viewed in FIG. 2, the male dowels 51 come to engagement with the female dowels 51a, thereby selecting the mesh of the first gears 11 and 21. Similarly, when the second shifter 4 is moved leftward as viewed in FIG. 2, the male dowels 41 come into engagement with the female dowels 41a, thereby selecting the mesh of the second gears 12 and 22. Similarly, when the third shifter 5 is moved rightward as viewed in FIG. 2, the male dowels 52 come into engagement with the female dowels 52a, thereby selecting the mesh of the third gears 13 and 23.

When the first shifter 3 is moved leftward as viewed in FIG. 2, the male dowels 31 come into engagement with the female dowels 31a, thereby selecting the mesh of the fourth gears 14 and 24. When the first shifter 3 is moved rightward as viewed in FIG. 2, the male dowels 32 come into engagement with the female dowels 32a, thereby selecting the mesh of the fifth gears 15 and 25.

The reverse gear 20 is in mesh with an idle reverse gear (not shown) mounted on another shaft (not shown) and meshing with the first gear 11. Accordingly, the reverse gear 20 is rotated in a direction reverse to the direction of rotation of the other shift gears on the counter shaft 2. When the second shifter 4 is moved rightward as viewed in FIG. 2, the male dowels 42 come into engagement with the female dowels 42a, thereby reverse rotating the counter shaft 2 through the mesh of the first gear 11, the idle reverse gear, the reverse gear 20, and the second shifter 4, thus obtaining a reverse output.

Figure 3:
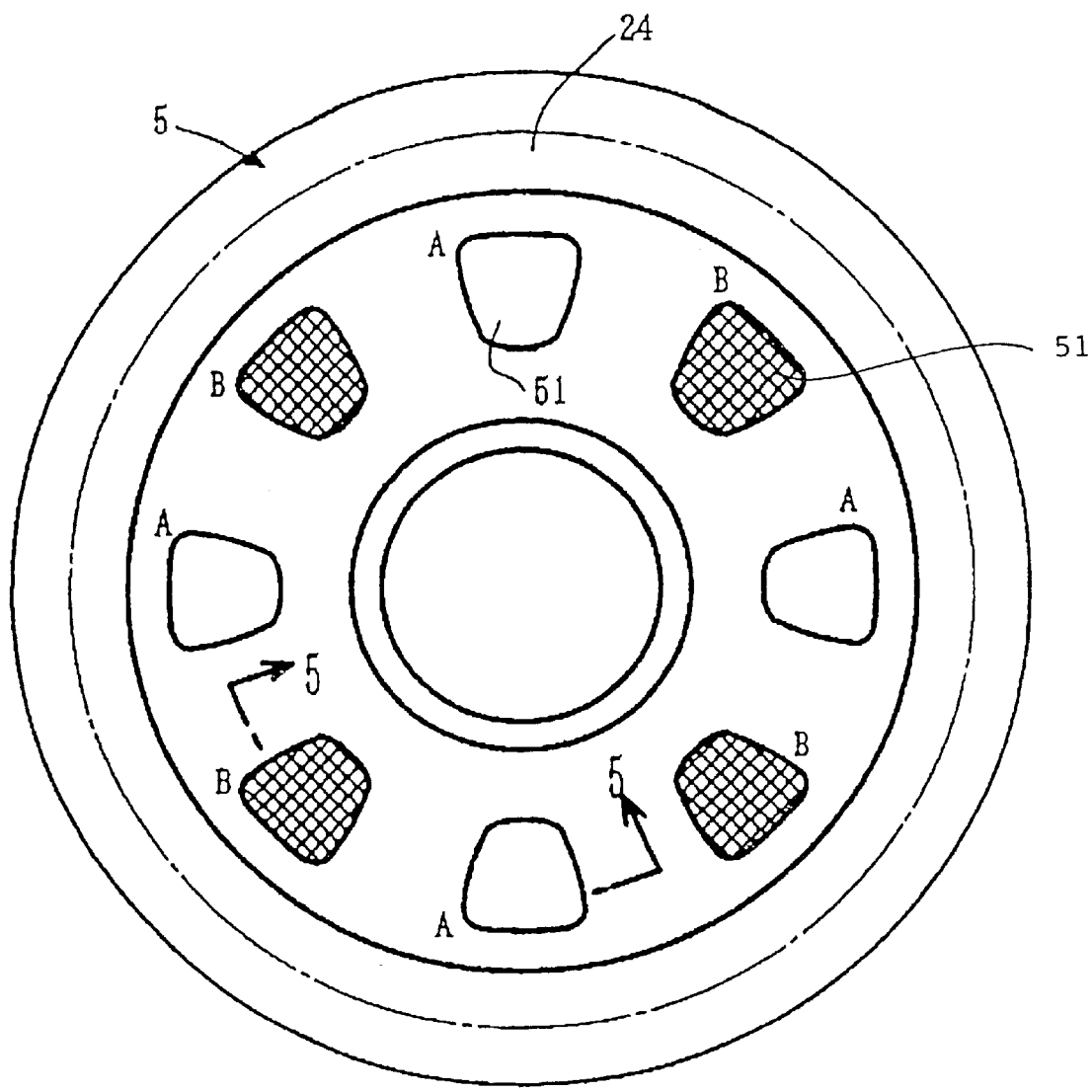
FIG. 3 is an elevational view showing male dowels formed on one surface of a dog clutch.
Figure 4:
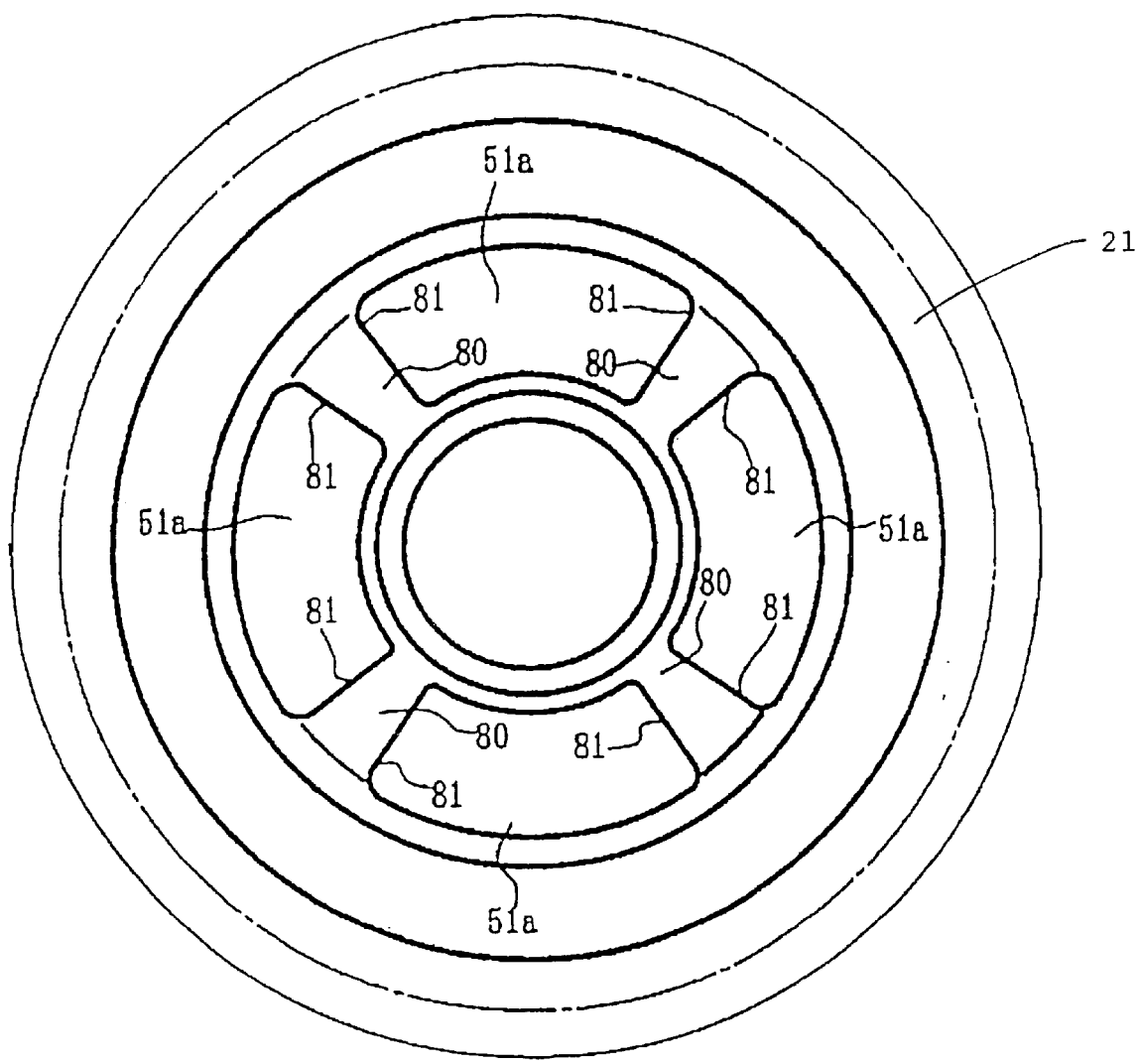
FIG. 4 is an elevational view of female dowels to be engaged with the male dowels shown in FIG. 3.

The dowel structure on the fourth gear 24, for example, will now be described (the shifters and the other gears have a similar dowel structure). FIG. 3 is an elevational view of the fourth gear 24 having the male dowels 51, as viewed from the left side in FIG. 2, and FIG. 4 is an elevational view of the first gear 21 having the female dowels 51a, as viewed from the right side in FIG. 2.

As shown in FIG. 3, the eight male dowels 51 are equally spaced in the circumferential direction of the fourth gear 24, and project in the axial direction of the fourth gear 24 integrally therewith. Each male dowel 51 is angular and has the shape of substantially quadrangular prism. The male dowels 51 may include four high male dowels 51(A) and four low male dowels 51(B). The four high male dowels 51(A) are larger in height (projection amount) than the four low male dowels 51(B). The four high male dowels 51(A) and the four low male dowels 51 (B) are alternately arranged.

FIG. 1 is an enlarged view of neighboring ones of the high and low male dowels 51(A) and 51(B). As shown in FIG. 1, each male dowel 51 has a substantially elliptical shape as viewed in elevation, and has a radially inner end 70, a radially outer end 71 wider than the radially inner end 70, and opposite sides 72 and 73 connecting the radially inner end 70 and the radially outer end 71. Each of the opposite sides 72 and 73 is formed by a curved surface C.

The four corners of each male dowel 51 are chamfered to form round surfaces. In FIG. 1, reference symbol O denotes the center of the radial width of each male dowel 51 (i.e., the distance between the radially inner end 70 and the radially outer end 71), and reference symbol P denotes a contact point between the high male dowel 51(A) and the female dowel 51a in their engaged condition. It should be noted that the contact point P is set at a position radially outside of the center O by a distance d.

As shown in FIG. 4, the four female dowels 51a are equally spaced in the circumferential direction of the first gear 21. Each female dowel 51a is a substantially sectorial dowel hole. Any neighboring ones of the female dowels 51a are partitioned by a substantially elliptical partition wall 80 whose radially outer side is wider. Each partition wall 80 has opposite side wall surfaces 81 exposed to the neighboring female dowels 51a. As shown in FIG. 1, each side wall surface 81 is formed by a flat surface D, and the four corners of each female dowel 51a are chamfered to form round surfaces. Each female dowel 51a has a size large enough to engage the neighboring male dowels 51(A) and 51(B) with play. Thus, the number of the female dowels 51a is half the number of the male dowels 51.

The third shifter 5 is formed by forging, and the male dowels 51 and 52 are integrated with the third shifter 5 by forging. The surface of each high male dowel 51(A) is machined. However, the surface of each low male dowel 51(B) is not machined after forging.

Figure 5:
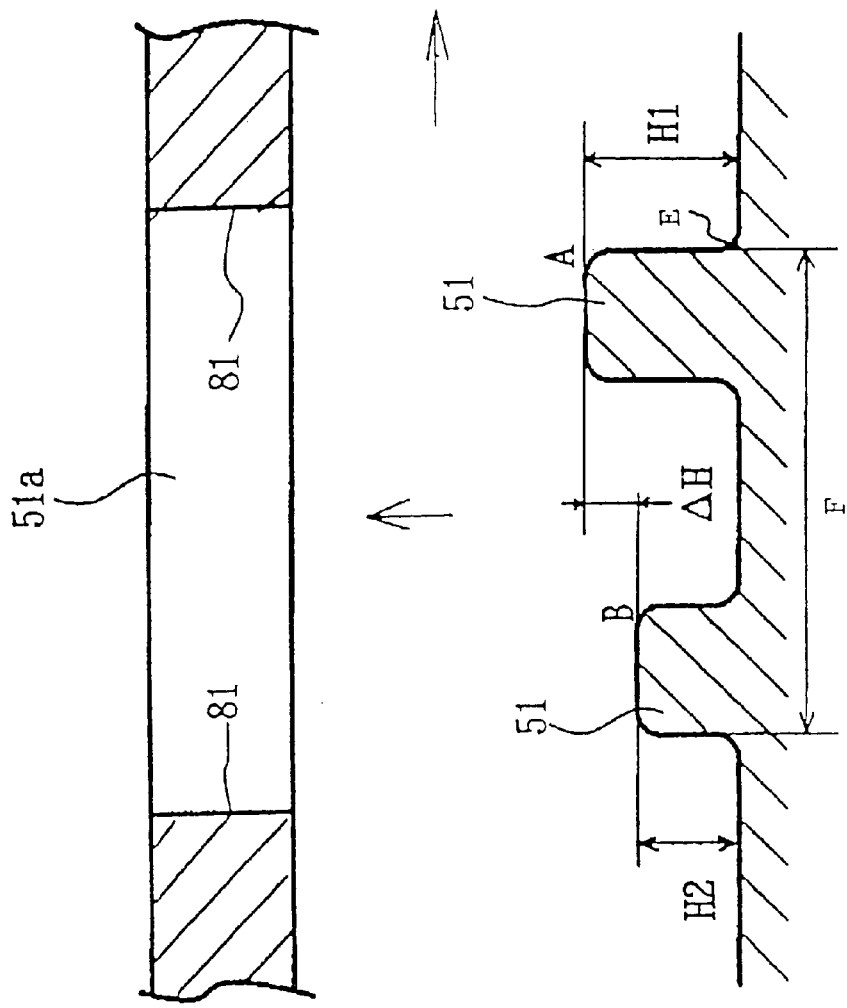
FIG. 5 is a cross section taken along the line 5—5 in FIG. 3.

FIG. 5 is a cross section taken along the line 5—5 in FIG. 3, showing the difference in height between the high male dowel 51(A) and the low male dowel 51(B). For the purposes of illustration, the height differences are exaggerated. In FIG. 5, reference symbol H1 denotes an actual height of the high male dowel 51(A), which actual dowel height is the sum of an effective dowel height in which the high male dowel substantially comes into contact with the female dowel on shifting and the height of a rounded dowel root E.

Reference symbol H2 denotes an actual height of the low male dowel 51(B), which actual height is smaller by ΔH than the actual height HI of the high male dowel 51(A). The tolerance of the actual height H2 of the low male dowel 51(B) is set as a maximum working tolerance by forging, and the amount ΔH is set as a difference which can ensure an absolute engagement amount necessary for reliable engagement of the dowels 51(A) and 51(B). That is, the difference obtained by subtracting this difference ΔH from the actual dowel height is equal to an effective dowel height of the low male dowel 51(B).

The operation of the preferred embodiment will now be described. FIG. 5 shows a condition where the male dowels 51 come into engagement with the female dowels 51a. Each high male dowel 51(A) first comes into engagement with the opposing female dowel 51a, and then comes into abutment against the side wall surface 81 of the corresponding partition wall 80. The distance between the neighboring high male dowels 51(A) is twice the distance F between the neighboring high and low male dowels 51(A) and 51(B). Accordingly, the chance of engagement can be increased to thereby obtain quick abutment of each high male dowel 51(A) against the corresponding side wall surface 81.

After each high male dowel 51(A) abuts against the corresponding side wall surface 81, each low male dowel 51(B) also comes into engagement with the opposing female dowel 51a, so that a proper play can be ensured. Furthermore, the side surface 73 of each male dowel 51 abutting against the corresponding side wall surface 81 is a curved surface, and the contact point P between the curved side surface 73 and the flat side wall surface 81 is set at a position radially outside of the center O by the distance d, so that it is possible to avoid the contact between a weak portion of the male dowel 51 near the radially inner end 70 and the side wall surface 81. Additionally, since the side surface 73 is a curved surface, the contact of the side surface 73 with the side wall surface 81 becomes smooth. Accordingly, the position of the contact point P defines the radius of a pitch circle.

Since the contact point P is offset radially outward from the center O, torque transmission can be performed by a thick-walled portion of each high male dowel 51(A), thereby improving the durability. Further, the contact point P can be arbitrarily set by setting the pitch circle. Moreover, since the surface of each low male dowel 51(B) is not machined, but it is a forged surface, the machining of the male dowels 51 can be reduced by half, thus effecting cost reduction.

On the other hand, when reverse torque is applied to the counter shaft 2, each low male dowel 51(B) comes into contact with the nearest side wall surface 81. Therefore, as compared with the case that only the high male dowels 51(A) are provided, the timing of contact of the male dowels 51 and the female dowels 51a can be made quicker, thereby reducing noise upon gear shifting. According to the preferred embodiment, the chance of engagement of the male and female dowels can be increased with a reduced play, and the degree of freedom of design can be increased. As a result, both manual and automatic gear changing can be carried out by the same gear.

The present invention is not limited to the above preferred embodiment, but various modifications may be made. For example, the surface of each high male dowel may also be left as a forged surface. In this case, the production cost can be further reduced.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A transmission comprising:

a shaft;

at least one gear arranged on the shaft;

at least one gear shifter disposed on the shaft for selectively engaging the gear; and a clutch for selectively engaging the gear with the gear shifter, the clutch comprising:

a first plurality of male dowels, each of the first plurality of male dowels having a first height and a curved engaging surface;

a second plurality of male dowels, each of the second plurality of male dowels having a second height less than the height of the first plurality of male dowels; and a plurality of female dowels, the female dowels being engageable with the first and second pluralities of male dowels for engaging the gear shifter with the gear, wherein the curved engaging surfaces contact the female dowels when the female dowels engage the first plurality of male dowels.

2. The transmission of claim 1, wherein the first plurality of male dowels are unmachined, forged elements.

3. The transmission of claim 1, wherein each of the plurality of female dowels has flat engaging surface, the flat engaging surfaces engaging the curved engaging surfaces when the female dowels engage the first plurality of male dowels.

4. The transmission of claim 1, wherein the first plurality of male dowels are arranged about a center point, each of the first plurality of male dowels having a length extending in a radial direction outward from the center point, an engagement point of the curved engaging surfaces with a respective female dowel being radially outward from a midpoint of the radially extending length of the first plurality of male dowels.

5. The transmission of claim 1, wherein each of the second plurality of male dowels has a curved engaging surface, the curved engaging surfaces contacting the female dowels when the female dowels engage the second plurality of male dowels, the second plurality of male dowels being arranged about a center point, each of the second plurality of male dowels having a length extending in a radial direction, an engagement point of the curved engaging surfaces of the second plurality of male dowels with a respective female dowel being radially outward from a midpoint of the radially extending length of the second plurality of male dowels.

6. The transmission of claim 1, wherein the first and second pluralities of male dowels are formed on a side surface of the gear shifter.

7. The transmission of claim 6, wherein the plurality of female dowels are formed on a side surface of the gear.

8. The transmission of claim 6, wherein the first and second pluralities of male dowels are arranged about a center point.

9. The transmission of claim 8, wherein the first plurality of male dowels is alternately arranged with the second plurality of male dowels.

10. The transmission of claim 1, wherein the number of female dowels is half the total number of the first and second pluralities of male dowels.

11. The transmission of claim 1, wherein the number of female dowels is equal to the number of the first plurality of male dowels.

12. The transmission of claim 1, wherein the plurality of female dowels consists of four female dowels.

13. The transmission of claim 1, wherein the first and second pluralities of male dowels are arranged about a center point, the first plurality of male dowels being alternately arranged with the second plurality of male dowels.

14. The transmission of claim 13, wherein the first plurality of male dowels are wider at their radially outward ends than at their radially inward ends.

* * * * *